RAILWAY CAR SIDE FILLER

Original Filed March , 1962 Sheets-Sheet

INVENTOR:
John S. Lundvall,
BY
Bair, Freeman & Molinare
ATTORNEYS.

RAILWAY CAR SIDE FILLER

Original Filed March 5, 1962 2 Sheets-Sheet 1

INVENTOR:
John S. Lundvall,
BY
Bair, Freeman & Molinare
ATTORNEYS.

United States Patent Office

Re. 26,249
Reissued Aug. 15, 1967

26,249
RAILWAY CAR SIDE FILLER

John S. Lundvall, Park Ridge, Ill., assignor to Unarco Industries, Inc., a corporation of Illinois Original No. 3,163,130, dated Dec. 29, 1964, Ser. No. 177,671, Mar. 5, 1962. Application for reissue Mar. 15, 1965, Ser. No. 455,026
4 Claims. (Cl. 105—369)

Matter enclosed in heavy brackets [ ] appears in the original patent but forms no part of this reissue specification; matter printed in italics indicates the additions made by reissue.

This invention relates to railway car side fillers and more particularly to an adjustable side filler construction for removable mounting in a railway car.

In shipping various type of goods in packages or cartons it becomes necessary to confine the goods against lateral shifting in the car as well as longitudinal shifting. The goods may be effectively held against longitudinal shifting by lading separating doors such as, for example, the type particularly disclosed and claimed in Patents Nos. 3,005,419, 3,017,843 and 3,018,741.

To prevent lateral shifting, it is necessary to provide a side filler in the car by which the effective interior width of the car can be varied to fit the cartons or packages relatively closely. When a car is always used for shipping the same goods, a side filler adjustable to a single position and retractable to provide substantially full width of the car is completely satisfactory. For other types of service, however, it is desirable to be able to adjust the side filler to any one of a plurality of different positions or even to remove it completely from the car. Structures as heretofore provided for this purpose were complicated and expensive and difficult to handle, as well as being difficult and expensive to install in a car.

It is one of the objects of the present invention to provide a railway car side filler which is simple and inexpensive in construction, which is easy to install in and remove from a car and which provides a plurality of adjustable positions to meet the requirements of substantially any type of service.

Another object is to provide a railway car side filler in which the side filler includes a framework easily mounted in and removable from latching openings normally provided in the car for latching the lading separating door.

According to a feature of the invention, the framework includes vertically extending rods fitting slidably in latching openings adjacent to the roof and floor of the car and provided with stops adjacent to their lower ends to limit downward movement thereof. By raising the framework to clear the lower latching openings it can easily be mounted in or removed from a car without requiring the use of tools or separate fastening means of any type.

A further object is to provide a railway car side filler in which the side filler panels carry notched brackets engageable with horizontal beams on the framework in different notches thereof to support the panels in any one of a plurality of adjusted positions.

According to a feature of the invention, the notches in the brackets are formed with square shoulders facing the adjacent side wall of the car to hold the panel securely against movement toward the side wall and with sloping sides facing the panel and which are slidable over the beams to permit adjusting movement of the panel away from the side wall relatively easily.

The above and other objects and features of the invention will be more readily apparent from the following description when read in connection with the accompanying drawings, in which.

Figure 1:
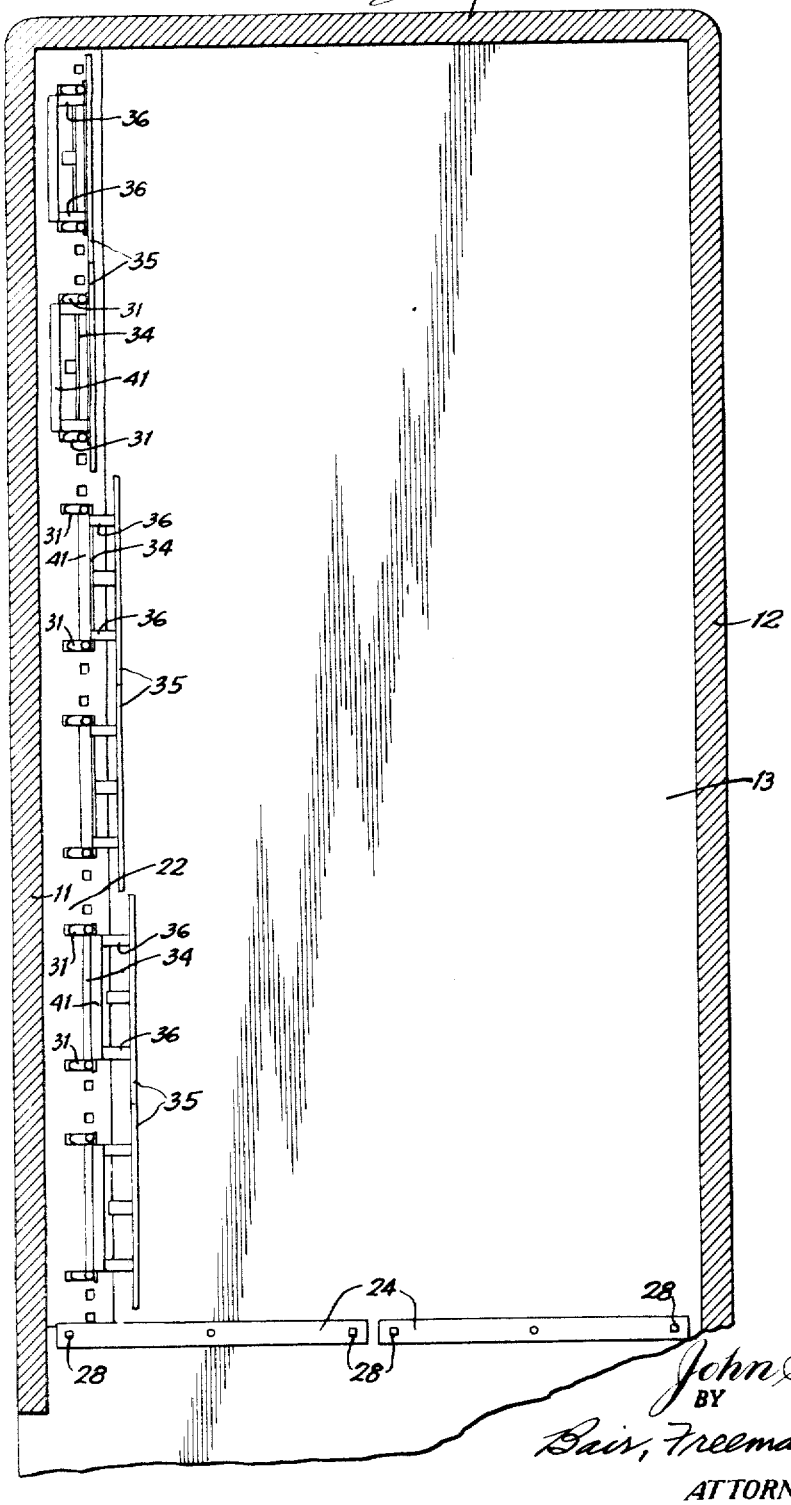
FIG. 1 is a partial horizontal sectional view through a railway car provided with a side filler embodying the invention.

The side filler of the present invention is adapted to be mounted in any conventional type of railway car having end walls 10, side walls 11 and 12, a floor 13 and a ceiling or roof 14. The car may be insulated or not, as desired, but if it insulated the walls are double thickness and insulating material is mounted between the inner and outer wall panels.

Elongated horizontal tracks 15 are secured in the car adjacent to the juncture of the roof and the side walls thereof. The tracks 15 are preferably formed of sheet metal bent into a generally channel section with an upper flat flange 16 abutting against and secured to the roof, a web 17 extending vertically downward from the roof, a lower flange 18 parallel to the flange 16 and an upwardly turned rim 19 serving as a track. The lower flange 18 is formed with a series of spaced openings 21 therein which are preferably rectangular openings and which serve as latching openings for lading separating doors, as described hereinafter as well as mounting openings for the side filler structure.

A latching strip 22 is mounted in the floor of the car and is flush with the upper surface of the floor or a floor rack therein. The latching strip, as shown, is preferably formed of sheet metal of inverted channel shape and is provided with a series of spaced latching openings 23, similar to and registering with the openings 21.

Figure 2:
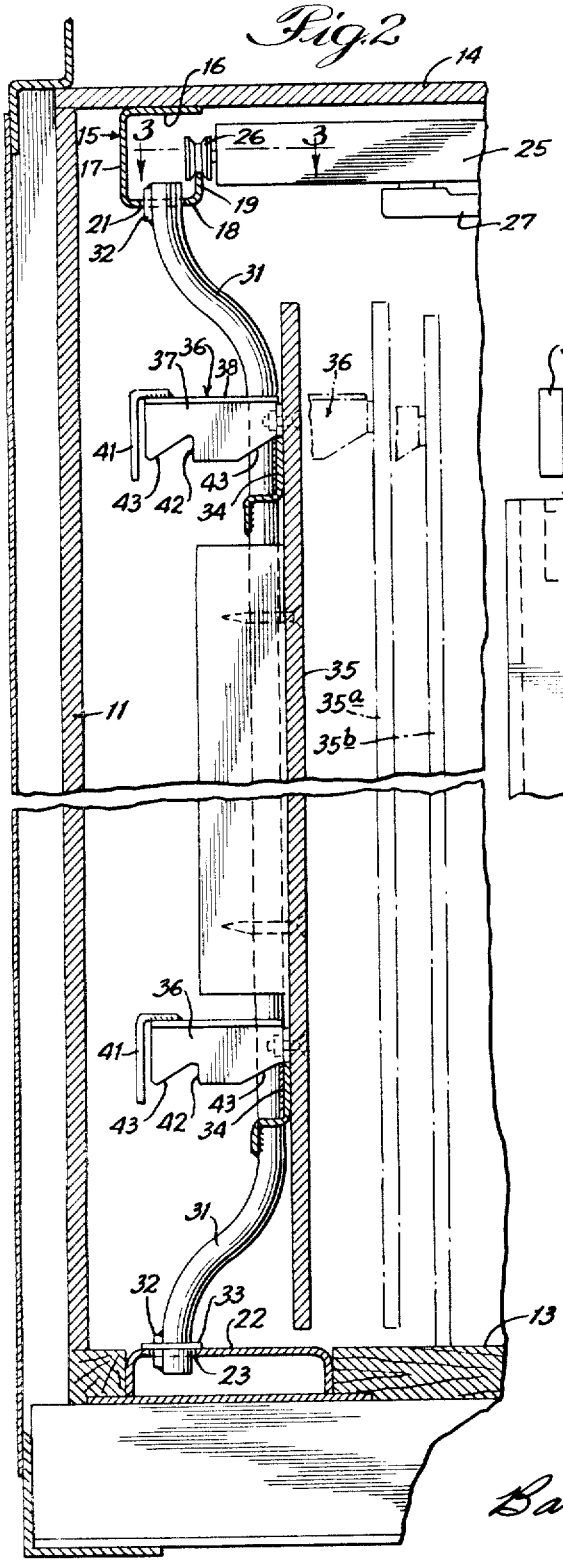
FIG. 2 is a partial vertical section through the car.

The lading in the car is held against longitudinal shifting therein by lading separating doors 24 which may be of the type more particularly described and claimed in Patent No. 3,018,741. The doors 24 are supported by a beam 25 extending transversely of the car and carrying rollers 26 at its ends which ride on the upturned track flange 19 of the track member, as best seen in FIG. 2. Arms 27 are pivoted to the beam at points spaced from the respective side walls of the car and the doors 24 are respectively pivotally supported from the free ends of the arms 27. The doors carry latching pins 28 at their upper and lower edges and adjacent to their side edges which may be moved outwardly from the doors to engage in the openings 21 and 23 of the latching strips to hold the doors in selected positions in the car. Since this mechanism, per se, forms no part of the present invention it will not be further described herein.

The side filler of the present invention comprises a series of sections of which six are illustrated in FIG. 1 and which are identical. Each section includes a framework formed of two or more vertically extending rods 31 which are offset at their upper and lower ends, as best seen in FIG. 2, and are of a length to extend into the upper openings 21 and the lower openings 23. The vertical members of each framework, of which two are shown for each framework in FIG. 1, are so spaced that they will simultaneously engage spaced pairs of latching openings in the track and floor latching strips 22. Preferably short rectangular filler strips 32 are secured to the end portions of the rods 31 to fit into the rectangular openings 21 and 23 so that the vertical rods will be held against any appreciable amount of free movement in the latching openings. In addition, the lower end of each rod 31 carries a stop collar 33 spaced slightly above the lower end of the rod, as seen in FIG. 2, to span the latching opening 23 in which the rod is inserted thereby to limit downward movement of the rod through the latching strip.

The rods are connected by horizontal beams 34 which are preferably of substantially Z-section, as seen in FIG. 2, with flat vertical portions secured to and overlying the faces of the rods next adjacent to the interior of the car and with horizontally and then vertically offset flanges thereon to stiffen and strengthen the beams. The beams are rigidly secured to the rods as by welding, as shown, so that the two rods and two beams of each side filler section are secured together in a rigid assembly.

The side filler is completed by a panel 35 which may be of wood, such as relatively heavy plywood, or other desired material metal. The panels 35 are of a width, as seen in FIG. 1, such that a series of side filler units may be assembled in the car in side-by-side relationship and will substantially fill the entire side wall space of the car.

Figure 3:
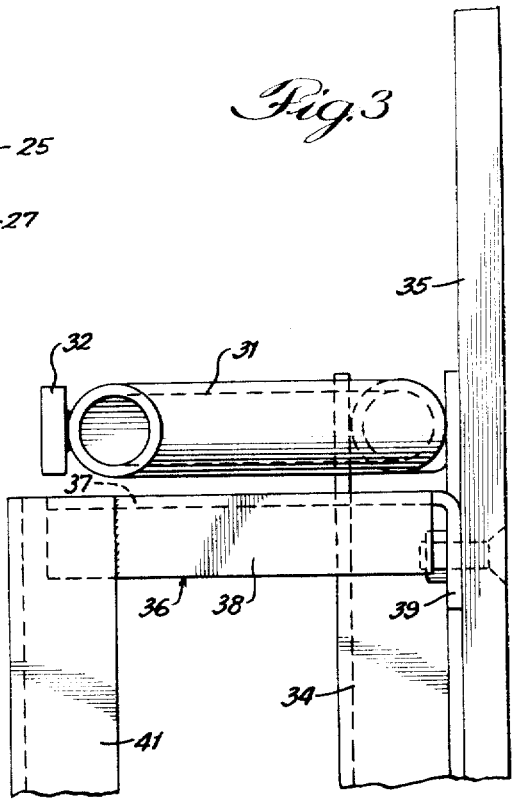
FIG. 3 is a partial section on the line 3—3 of FIG. 2.

According to a feature of the invention, the panel units are adjustably secured to the framework for movement to different positions spaced different distances from the side wall of the car so that the effective width of the car may be varied. For this purpose, each panel carries two upper and two lower horizontally extending brackets 36 which are secured to the rear face of the panel and extend therefrom toward the side wall of the car. As best seen in FIG. 3, each bracket is formed of sheet metal with a vertical web 37 and a horizontal top flange 38 stiffening and strengthening the web. At one end, the web is turned over, as shown at 39, and is secured to the adjacent panel, as by bolts or similar fastenings. At their inner ends the brackets at the same vertical level are interconnected by sheet metal L-section beams 41 whose upper flanges may be welded to the upper flanges 38 of the brackets and whose vertical flanges are spaced from the ends of the brackets, as shown in FIG. 2, a distance sufficient to accommodate the vertical panels of the beams 34.

In use when a side filler is to be mounted in a car, the framework therefor may be carried into the car and the upper ends of the rods 31 may be inserted through the track latching openings 21 near the top of the car. The rods may be pushed up to a point where their lower ends clear the bottom latching strips 22 and can be swung inwardly over the lower latching strips 22 until their lower ends register with and drop into latching openings 23 in the latching strip. The stop collars 33 will limit downward movement of the rods to a position in which the upper ends thereof still project into the latching openings 21 so that the rods will be securely held in position. For removing the framework this process may be reversed. It will be noted that in neither case are any tools nor separate fastenings required.

A panel may then be set onto the framework, as shown in FIG. 2, with the brackets 36 overlying and resting upon the cross beams 34 between the rods 31. It will be noted that each bracket is formed in its lower surface with an outer notch defined by a square shoulder 42 facing the adjacent car side wall and a sloping surface 43 facing the panel and with a similar sloping surface 43 adjacent to the panel. For maximum car width with the filler in place, it may be moved inward to the full line position shown in FIG. 2 and as shown in the two side filler units at the top of FIG. 1 with the beams 34 resting against the panel inner surface and with the adjacent sloping surface 43 holding the panel against accidental dislodgement. The panel may also be moved outwardly to an intermediate position illustrated in dot-dash lines at 35a simply by raising the panel and pulling it toward the center of the car. At this time, the upper edges of the beams 34 will be received in the outer notches in the brackets, the square shoulder 42 securely holding the panel against movement toward the adjacent car side wall. It will be noted that because of the sloping surface 43 the panel may be slid inwardly toward the car center relatively easily. This position of the side filler unit is illustrated by the center two units in FIG. 1.

For minimum car width the panel may be moved still further inwardly to the position shown in dot-dash lines shown at 35b in FIG. 2 and by the lower two units of FIG. 1. In this position the beams 34 fit in the space between the ends of the brackets 36 and the vertical flanges of the beams 41. It will be noted that the vertical flanges of the beams 41 extend below the brackets so that there is no likelihood of pulling the panel accidentally away from the framework. While one embodiment of the invention has been shown and described herein, it will be understood that it is illustrative only and not to be taken as a definition of the scope of the invention, reference being had for this purpose to the appended claims.

What is claimed is:

1. In a railway car having spaced side walls, a roof and a floor, tracks in the car adjcent to the junctures of the roof and side walls, means movable on the tracks for supporting lading separating doors in the car, the tracks including horizontal surfaces formed with spaced latching openings to receive latching pins on the lading separating doors, latching strips in the floor of the car adjacent to the side walls formed with spaced latching openings therein, a framework including vertically extending rods connected by horizontally extending beams, the ends of the rods fitting removably into latching openings in the track and latching strip adjacent to one side wall of the car to mount the framework in the car, a vertical panel parallel to and spaced from said one side wall, and means adjustably connecting the panel to the framework for adjustment toward and away from said one sidewall.

2. In a railway car having spaced side walls, a roof and a floor, tracks in the car adjacent to the junctures of the roof and side walls, means movable on the tracks for supporting lading separating doors in the car, the tracks including horizontal surfaces formed with spaced latching openings to receive latching pins on the lading separating doors, latching strips in the floor of the car adjacent to the side walls formed with spaced latching openings therein, a framework including vertically extending rods connected by horizontally extending beams, the ends of the rods fitting removably into latching openings in the track and latching strip adjacent to one side wall of the car to mount the framework in the car, a vertical panel parallel to and spaced from said one side wall, and means adjustably connecting the panel to the framework for adjustment toward and away from said one side wall, the vertical rods being provided with stops adjacent to their lower ends to limit downward movement thereof into the latching strip whereby the framework can be mounted in or demounted from the car by sliding the upper ends of the rods upwardly through the openings in the track until their lower ends clear the latching strip.

3. The construction of claim 2 in which the panel carries a plurality of horizontal brackets formed in their lower edges with spaced notch portions selectively engageable with the beams adjustably to secure the panel to the framework.

*4. A portable side filler for use in a railway car having a roof, a floor and side walls, elongated supporting means in the car adjacent to the juncture of a side wall and the roof and formed with spaced latching apertures, elongated supporting means in the car adjacent to the juncture of said side wall and the floor, said side filler comprising a vertical frame movable to different positions in the car adjacent and parallel to said side wall, pin means on the frame to fit into selected ones of the apertures to secure the frame in any selected one of such positions in the car, a vertical panel, and means connecting the panel to the frame in spaced parallel relation thereto, said connecting means being adjustable to vary the spacing of the panel from the frame and said car side wall.*

References Cited

The following references, cited by the Examiner, are of record in the patented file of this patent or the original patent.

UNITED STATES PATENTS

| | | | |
|---|---|---|---|
| 1,506,462 | 8/1924 | Thompson. | |
| 1,753,400 | 4/1930 | Bryson. | |
| 1,963,545 | 6/1934 | Campbell et al. | 105—369 |
| 2,819,810 | 1/1958 | De Witt | 105—369 |
| 2,885,221 | 5/1959 | Weeks | 105—369 |
| 3,017,843 | 1/1962 | Loomis et al. | 105—376 |
| 3,163,130 | 12/1964 | Lundvall. | |

ARTHUR L. LA POINT, *Primary Examiner.*

DRAYTON E. HOFFMAN, *Examiner.*